United States Patent [19]

Miller

[11] 4,351,554
[45] Sep. 28, 1982

[54] MOTOR VEHICLE SLEEPER UNIT

[75] Inventor: Gene H. Miller, North Palm Beach, Fla.

[73] Assignee: Livlab, Inc., Lake Park, Fla.

[21] Appl. No.: 302,173

[22] Filed: Sep. 14, 1981

Related U.S. Application Data

[63] Continuation of Ser. No. 125,289, Feb. 27, 1980, abandoned.

[51] Int. Cl.³ .................. B62D 25/00; B60P 3/32
[52] U.S. Cl. ................... 296/24 R; 296/164; 180/89.14
[58] Field of Search ......... 296/156, 164, 166, 24 R, 296/190; 180/89.14, 89.15

[56] References Cited

U.S. PATENT DOCUMENTS

| | | | |
|---|---|---|---|
| D. 175,748 | 10/1955 | Temp. | |
| 3,000,665 | 9/1961 | Reeves | 296/24 |
| 3,207,166 | 9/1965 | Wintzer | 296/24 R |
| 3,405,778 | 10/1968 | Martin | 180/24 |
| 3,485,522 | 12/1969 | Reinarts | 296/24 |
| 3,612,599 | 10/1971 | Sternberg | 296/24 |
| 3,758,147 | 9/1973 | Burton | 296/23 R |
| 3,817,545 | 6/1974 | Ward | 296/164 |
| 3,841,693 | 10/1974 | Reynolde et al. | 180/89.14 |
| 3,843,189 | 10/1974 | Duff et al. | 296/1 R |
| 3,857,602 | 12/1974 | Karkau et al. | 296/35 A |
| 3,879,081 | 4/1975 | Hockley et al. | 296/28 C |
| 4,093,301 | 6/1978 | Kmok | 296/166 |
| 4,109,485 | 8/1978 | Grosskopf | 180/89.14 |
| 4,121,684 | 10/1978 | Stephens | 180/89.14 |

*Primary Examiner*—Robert R. Song
*Attorney, Agent, or Firm*—Webb, Burden, Robinson & Webb

[57] ABSTRACT

A sleeper unit for a motor vehicle having a frame with a cab mounted thereon is a closed compartment mounted on the frame by means which permit the unit to be tilted mechanically or manually with respect to the frame. The unit is particularly useful on a vehicle having a cab-over-engine design in which the cab is adapted to tilt for access to the engine for maintenance and/or repair.

21 Claims, 9 Drawing Figures

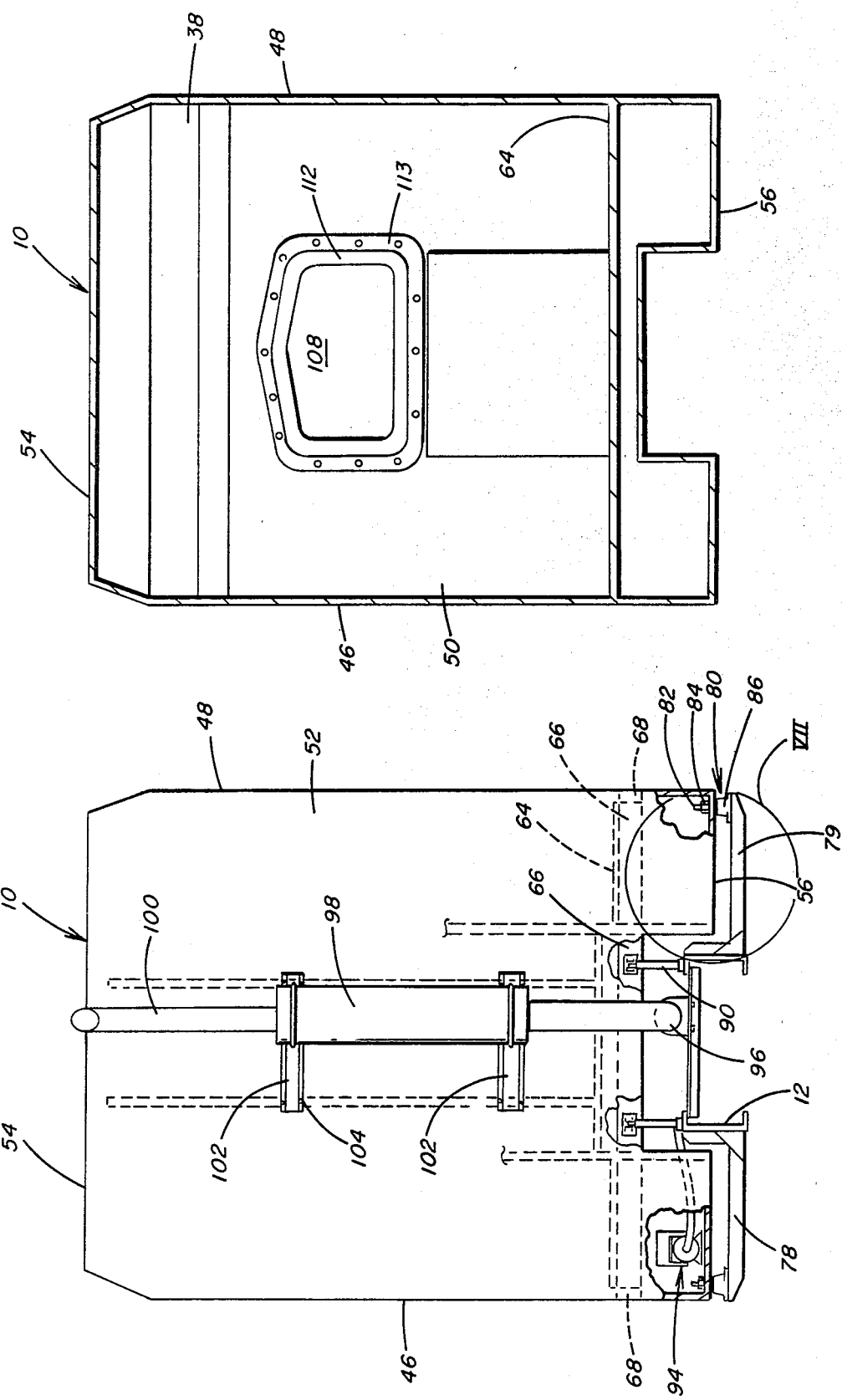

MOTOR VEHICLE SLEEPER UNIT

This application is a continuation of application Ser. No. 125,289, filed Feb. 27, 1980, abandoned.

BACKGROUND OF THE INVENTION

1. Field of the Invention

This invention relates to sleeper units for motor vehicles and particularly to those useful in an over-the-road tractor having a cab-over-engine design in which the cab is tiltable with respect to the vehicle frame for access to the engine for maintenance and/or repair.

2. Description of the Prior Art

State legislated length restrictions on over-the-road motor vehicles, especially tractor-trailer combinations, have resulted in tractor designs in which the cab is mounted over the engine. Such designs reduce the length of the tractor cab to permit a longer trailer to be used and therefore a larger payload to be transported. Access to the engine for maintenance and/or repair in a cab-over-engine design is usually obtained by tilting the cab forwardly on the vehicle frame. In present cab-over-engine designs which include a bed or sleeper area behind the seats in the cab or above the cab, tilting of the cab results in tilting of the bed, thereby dislodging bed clothes, pillows and any notions which might be in the area. In those designs in which a separate sleeping area or compartment is provided, for example in campers for pick-up trucks, that part of the compartment which extends over the cab would interfere with the tilting of the cab in cab-over-engine type vehicles.

SUMMARY OF THE INVENTION

The present invention is a sleeper unit for a motor vehicle having a frame with a cab mounted thereon. The unit comprises a closed compartment which is mounted on the frame by means which permit the unit to be tilted mechanically or manually with respect to the vehicle frame. In one form of tilting means of the invention, the compartment is supported on spaced outrigger members secured to the vehicle frame and the compartment is bolted to the rearwardmost outrigger members. In another form, the tilting means is a pivot connection provided by at least one pivot rod journaled in brackets on a support frame of the compartment and rod support means secured to the vehicle frame. In either case, mechanical tilting is achieved by activation of pneumatic or hydraulic cylinders controlled by an operator. In a preferred embodiment of the invention, a part of the closed compartment extends forwardly of the vehicle and over the cab to provide increased sleeping area and means are provided between the forwardly extending part of the compartment and the roof of the cab for absorbing shock therebetween, especially shock resulting from uneven road surfaces. Openings may be provided in the cab and sleeper unit to permit interior access between the cab and the sleeper unit.

DESCRIPTION OF THE DRAWINGS

In the Drawings

FIG. 5 is a rear view of the vehicle of FIG. 1 with portions removed to show details of the sleeper unit and means for tilting the unit;

FIG. 6 is a sectional view taken along lines VI—VI of FIG. 3 showing the access openings between the tractor cab and the sleeper unit;

DETAILED DESCRIPTION OF PREFERRED EMBODIMENTS OF THE INVENTION

Figure 1:
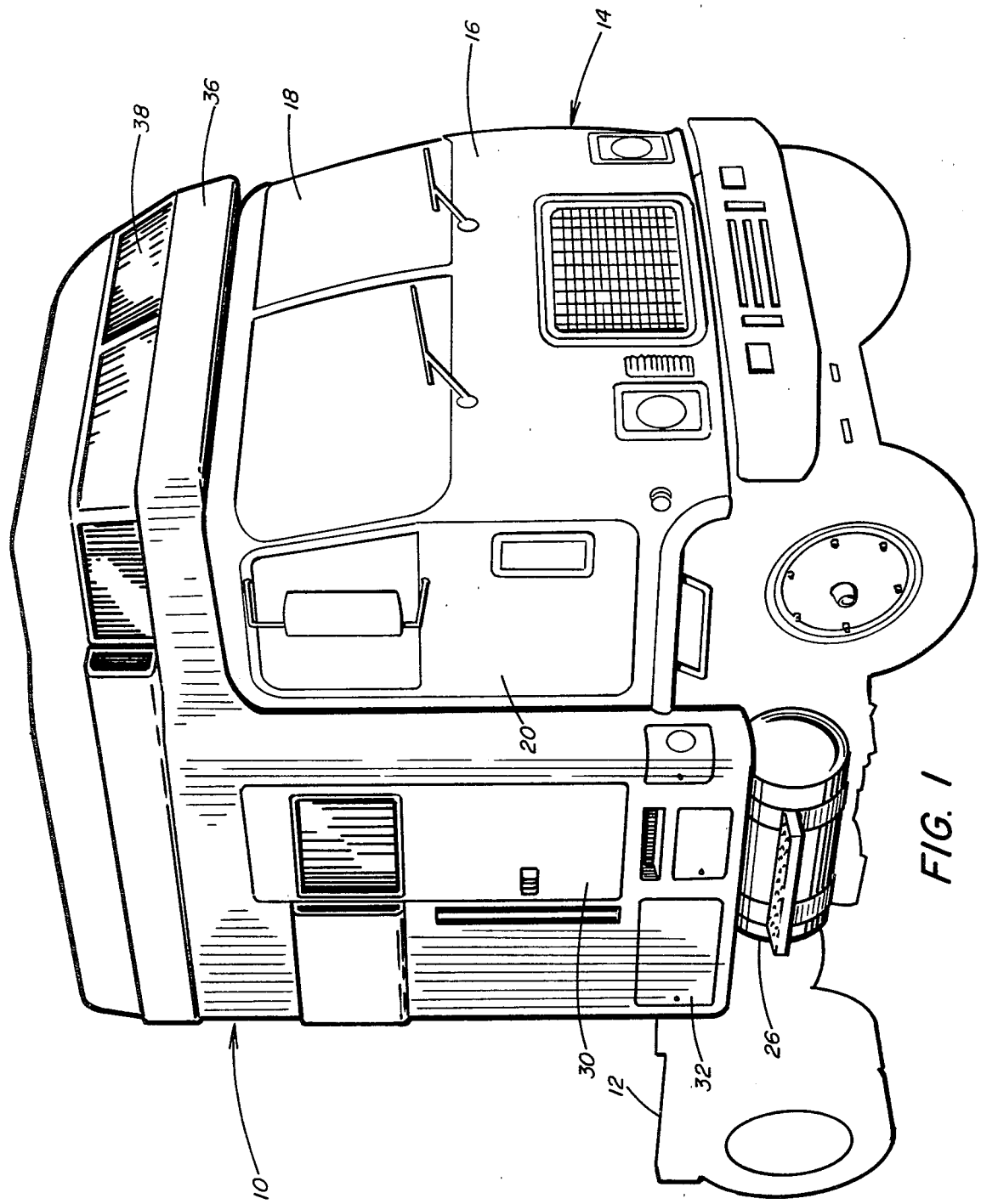
FIG. 1 is a perspective view (looking at the right or passenger side) of a motor vehicle, i.e. a tractor, having a sleeper unit mounted on the vehicle frame.
Figure 2:
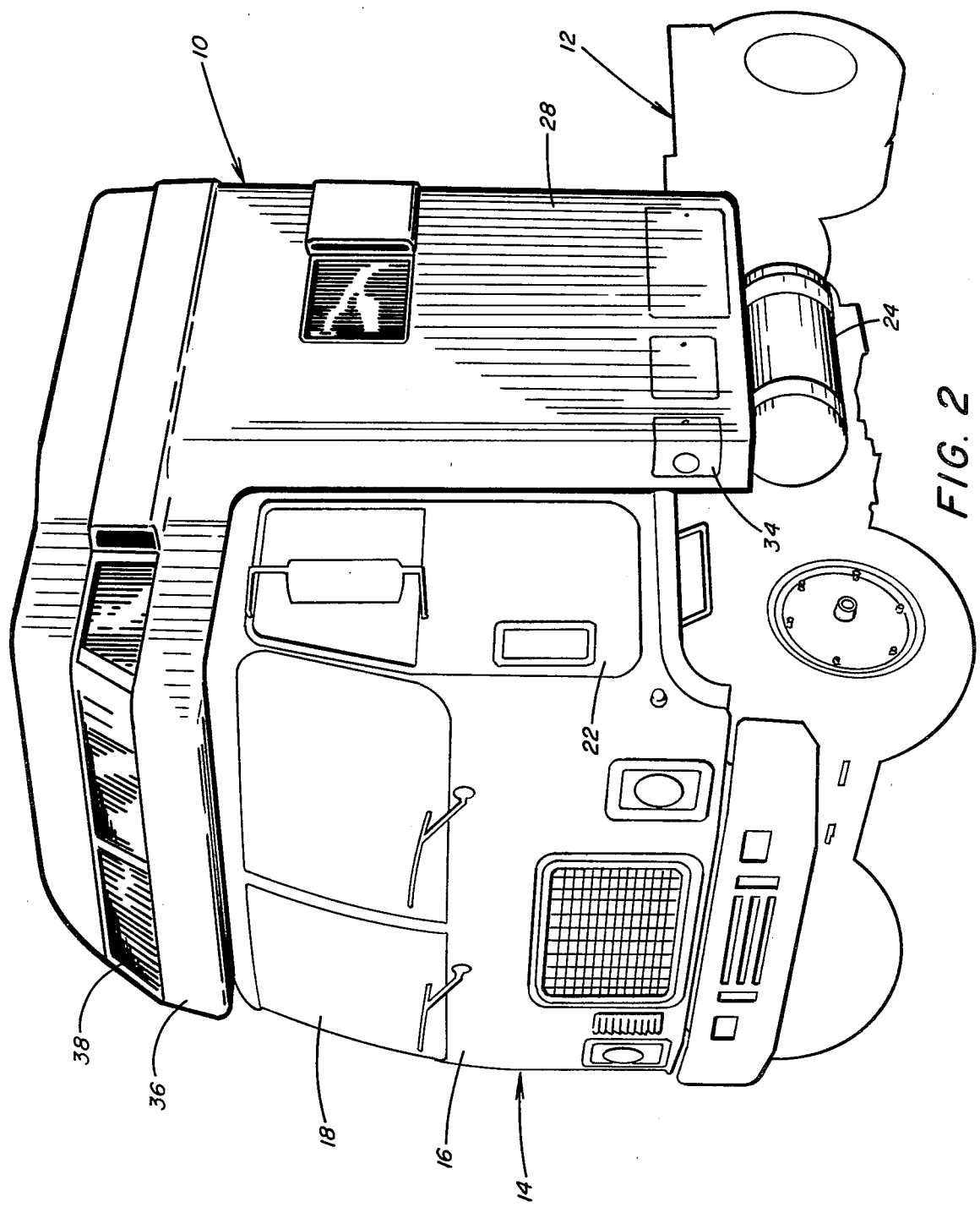
FIG. 2 is a perspective view (looking at the left or driver side) of the vehicle of FIG. 1.

Referring to FIGS. 1 and 2, the sleeper unit 10 in accordance with the invention is adapted to be mounted on a frame 12 of a motor vehicle, such as tractor 14. The tractor 14 has an over-the-engine cab 16 which, for purposes of maintenance and/or repair must be tilted forwardly, as is well known in the art, to provide access to the engine which is located under the cab 16. The tractor 14 also includes the usual windshield 18, passenger door 20, drive door 22 and saddle tanks, 24, 26.

The sleeper unit 10 is mounted on the vehicle frame 12 directly behind the cab 16. The unit 10 includes a main compartment 28 which is accessible through door 30 from the outside and also, preferably, through access openings from the cab 16 as will be described hereinafter. Various storage compartments 32 and access openings 34 for fuel and the like are provided in the exterior wall of the sleeper unit 10. The main compartment 28 opens into a sleeper compartment 36 which extends forwardly over the roof of cab 16. A windshield 38 is provided at the front of the compartment 36. The sleeper compartment 36 is designed to hold a bed, while additional accessories such as a bath, shower, stove, table and storage closets and cabinets are provided in the main compartment.

Figure 3:
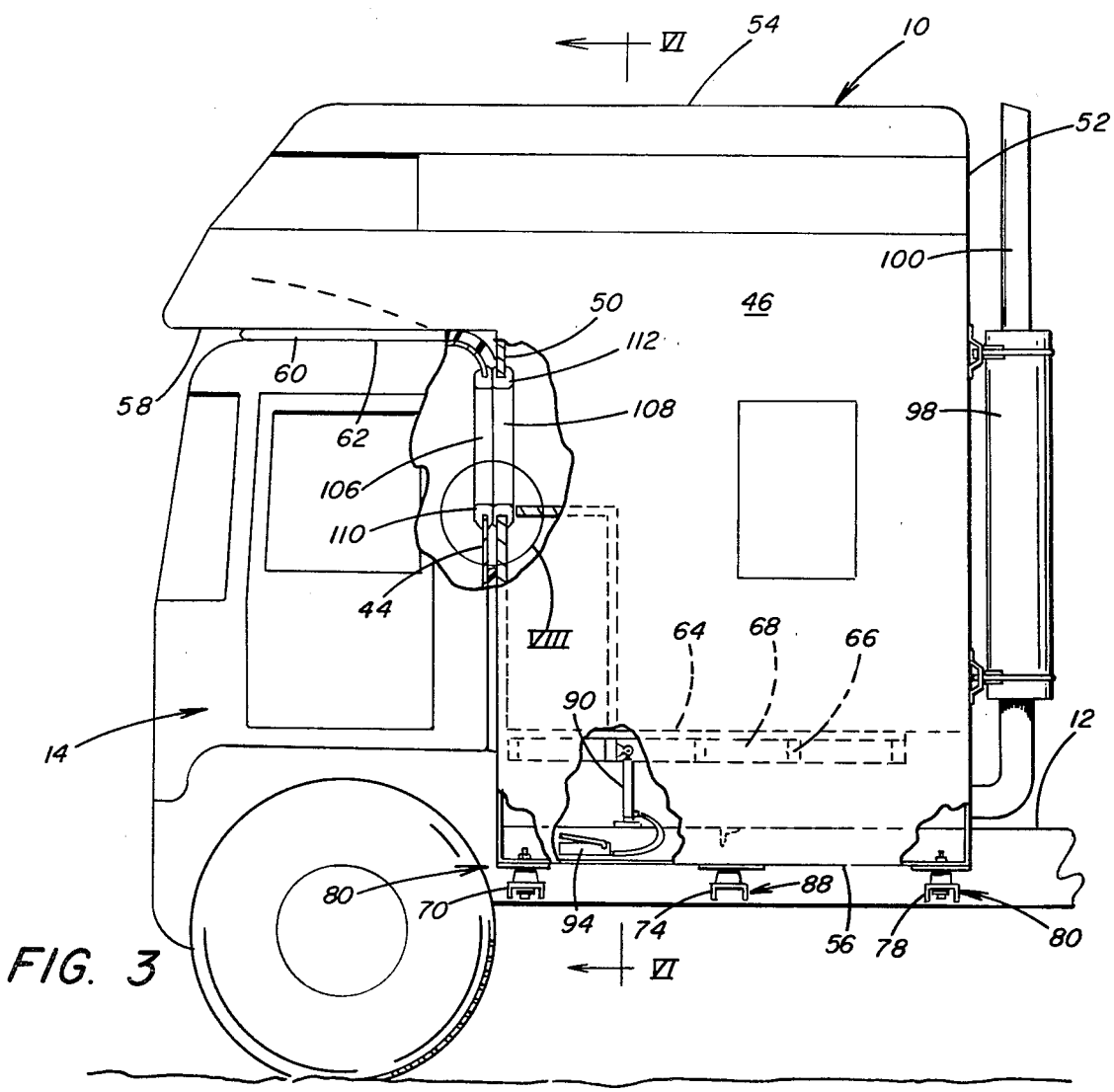
FIG. 3 is an elevation view of the vehicle of FIG. 1 with portions removed to show details of the sleeper unit with the tractor cab and sleeper unit in normal over-the-road running position.
Figure 4:
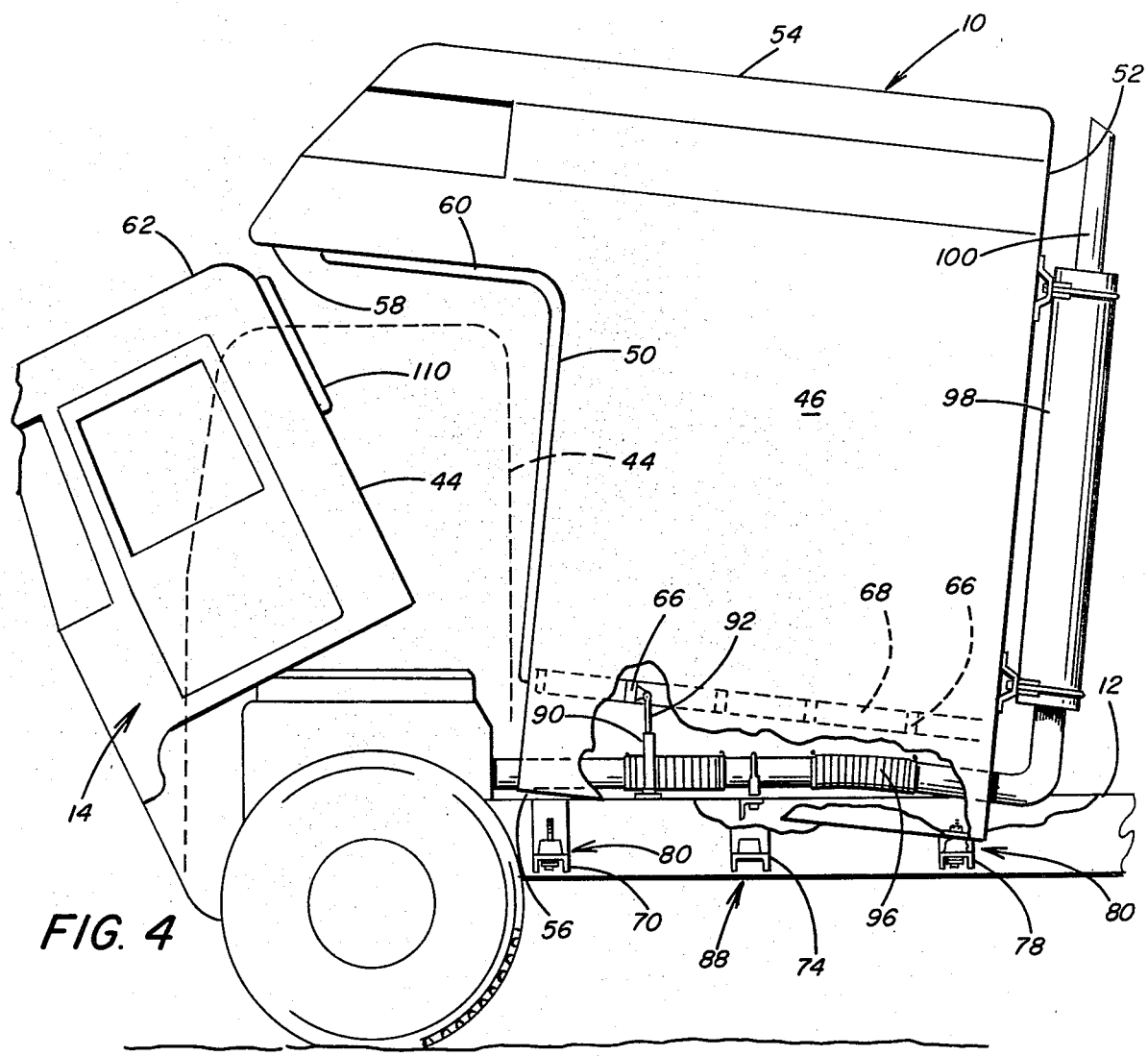
FIG. 4 is an elevation view of the vehicle of FIG. 1 with portions removed to show details of the sleeper unit and with the tractor cab and sleeper unit in their respective tilted positions.
Figure 8:
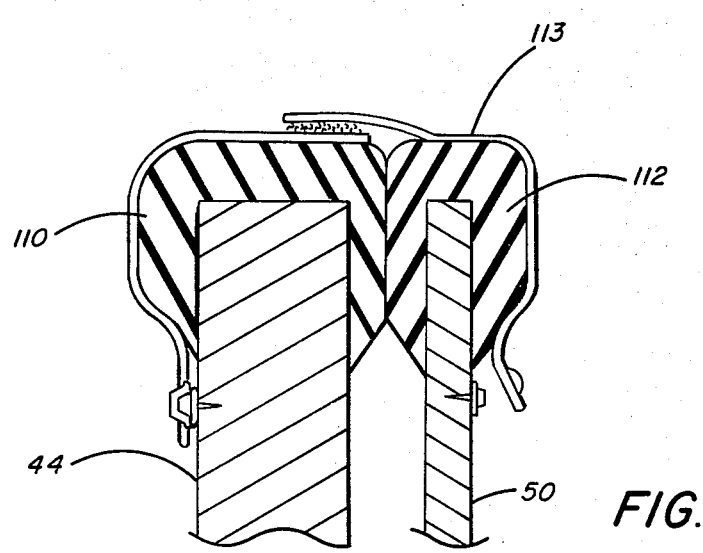
FIG. 8 is an enlarged view of the portion of FIG. 3 designated VIII showing the sealing means for the access openings between the sleeper unit and the vehicle cab.

According to the invention, as shown in FIGS. 3, 4 and 5, the sleeper unit 10 is mounted on the vehicle frame 12 behind and closely adjacent rear wall 44 of cab 16. The unit is preferably made of fiberglass -balsa core material with a reinforced aluminum frame, although other materials having sufficient strength and stability such as steel, aluminum and other metals and plastic materials, are equally suitable. The unit has opposed upstanding side walls 46, 48, front wall 50, rear wall 52, top wall 54, and bottom wall 56. The top wall 54 extends over the main and sleeper compartments. The sides of the sleeper compartment are closed by suitable wall portions integral with the side walls 46, 48 of the main compartment 28. The sleeper compartment also includes a bottom wall 58. A shock absorbing pad 60 of resilient material such as closed cell neoprene foam is provided between top wall 62 of cab 16 and the bottom wall 58 of the sleeper compartment 36.

A floor 64 is provided in the main compartment 28 supported by a plurality of spaced support members 66 which extend transversely of the compartment and are secured to a box frame 68, preferably formed of 2"×4" structural aluminum, secured to the side, front and rear walls of the main compartment 28.

The sleeper unit 10 is supported on the frame 12 of the tractor 14 by a series of spaced outrigger members 70, 72; 74, 76; and 78, 79 which are preferably welded to the frame 12. Each outrigger member extends outwardly from the frame 12 a length slightly less than the distance from the frame to a side wall 46, 48 of the sleeper unit 10.

The sleeper unit 10 is normally secured to the forward outrigger members 70, 72 and rearward outrigger members 78, 79 by a plurality of shock mountings 80, each of which includes a bolt 82, nut 84 and grommet member 86. It is also supported by shock mountings 88 on intermediate outrigger members 74, 76. The grommet members 86 are made of neoprene rubber or similar compressible material which serves as a shock absorber, as well as permitting the unit to be tilted with respect to frame 12 as described hereinafter. The rear of the unit is held by bolts 82 which are welded to outrigger members 78, 79, extend through grommet members 86, through the bottom wall 56 of compartment 28 and are held by nuts 84. The forward end of the compartment 28 is adapted to be secured to outrigger members 70, 72 using identical connections; however, the forward shock mountings 80 are accessible from outside of the unit 10 such that the nuts 84 can be removed from the bolts 82 by an operator to permit tilting of the unit.

Tilting of the unit 10 with respect to the vehicle frame 12 can be achieved either mechanically or manually. The preferred mechanical system includes a pair of hydraulic cylinders 90, each of which is secured at one end to the frame 12. The cylinder pistons 92 are secured at their opposite ends to a support member 66 at the front of the unit 10. The cylinders 90 are adapted to be energized hydraulically through a system, such as shown schematically in FIG. 9, which is operable through a hand or foot pump 94. By activating the pump, fluid pressure causes the pistons to be extended from the cylinder, thus raising the front of the sleeper unit and tilting it on the grommet members in the shock mountings at the rear of the sleeper unit. Instead of a hydraulic system, a pneumatic system may be used, or the unit may be tilted manually. Only a very small amount of tilting of the unit 10 is required to permit the cab 16 to be tilted sufficiently (as shown in FIG. 4) to gain access to the engine for repair, maintenance or the like. This small tilting angle, which is preferably on the order of 6°, will not cause anything in the sleeper unit to become dislodged.

As particularly shown in FIGS. 4, and 5, in order to tilt the sleeper unit 10 with respect to the frame 12, it may be necessary to modify the tractor exhaust system. In a preferred embodiment, therefore, a flexible conduit or hose 96 is provided between the engine exhaust manifold (not shown) and the rear of the unit 10 so that when the unit is tilted, there will be some "give" to the exhaust conduit to avoid rupturing it. As shown in FIG. 5, the exhaust conduit terminates in the usual muffler 98 and the tail pipe 100. The muffler and tail pipe are attached to the rear wall 52 of the unit by spaced brackets 102 and fasteners 104.

In another form of the invention, the tilting means may comprise a pair of brackets mounted at the rear of the unit with a pivot rod journaled in the brackets and brackets attached to the frame. In this embodiment, when the front of the unit is raised by hydraulic or pneumatic cylinders, the pivot rod, which is journaled in the brackets, rotates permitting the front of the unit to be raised with respect to the frame.

Figure 7:
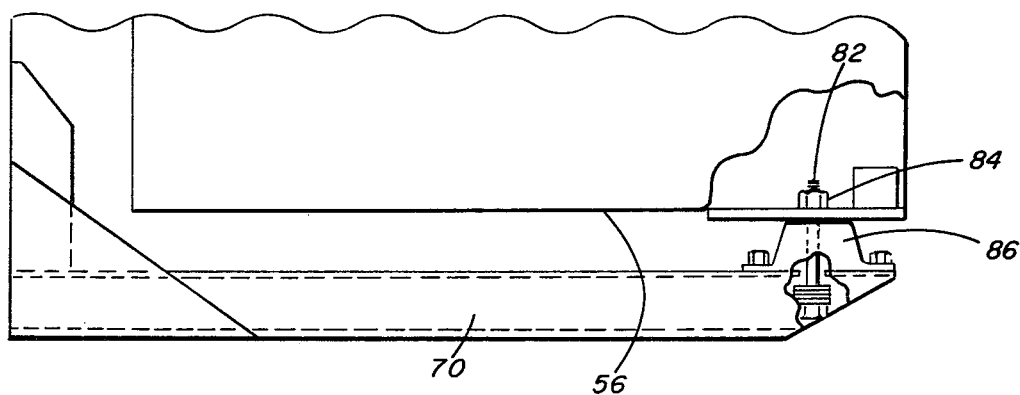
FIG. 7 is an enlarged view of the portion of FIG. 5 designated VII showing a typical mounting means for the sleeper unit on the vehicle frame.

FIG. 7 shows in detail the shock mounting between an outrigger member, such as outrigger member 70, and the bottom wall 56 at the rear of the unit. The mounting comprises an upstanding bolt 82 which is welded to the outrigger member 70, a grommet member 86 provided between the member 70 and wall 56, and a securing nut 84 to retain the unit on the outrigger member 70. This typical connection is preferably used at the front and rear corners of the unit 10 and serves as a shock absorber for the unit on the frame 12. When it is desired to tilt the unit 10 to permit the cab to be tilted to gain access to the engine, the nuts 84 on the shock mountings at the front of the unit are removed before activating the hydraulic lifting system through the pump 94. Of course, once the nuts are removed, the front of the unit may be raised manually, if required, although the weight of the unit may make such a manual operation extremely difficult, especially in view of the moment exerted by the forwardly extending sleeper compartment 36.

Although exterior access to the main compartment (and from there to the sleeper compartment) can be gained through the outside opening door 30 shown in FIG. 1, it is preferable that interior access from the cab 16 to the compartments and vice versa be provided so that there is access to the sleeper unit without the need for the operator to stop the vehicle. As shown in FIGS. 3, 4, 6 and 8, such access is provided in a preferred embodiment of the present invention by an access opening 106 which is formed in the rear wall 44 of the cab 16 and by an opening 108 formed in the front wall 50 of the main compartment 28. The openings 106 and 108 are disposed opposite to and adjacent one another so that a crawl space is provided between the cab 16 and the unit 10. The openings 106 and 108 are sealed against dirt and weather elements by means of sealing elements 110 and 112, which extend in abutment around the periphery of the openings 106 and 108, respectively, as more particularly shown in FIG. 8. The sealing elements are preferably in the form of a collar and are made of closed cell foam material, such as neoprene rubber or the equivalent. The foam material may be protected by a vinyl covering 113. In addition to sealing against the weather elements, the sealing elements keep out water and vapors, absorb the heaving motion of the sleeper unit with respect to the cab and cushion the edges of the access openings so that a person can crawl through the opening, even while the vehicle is in motion, without being injured.

Figure 9:
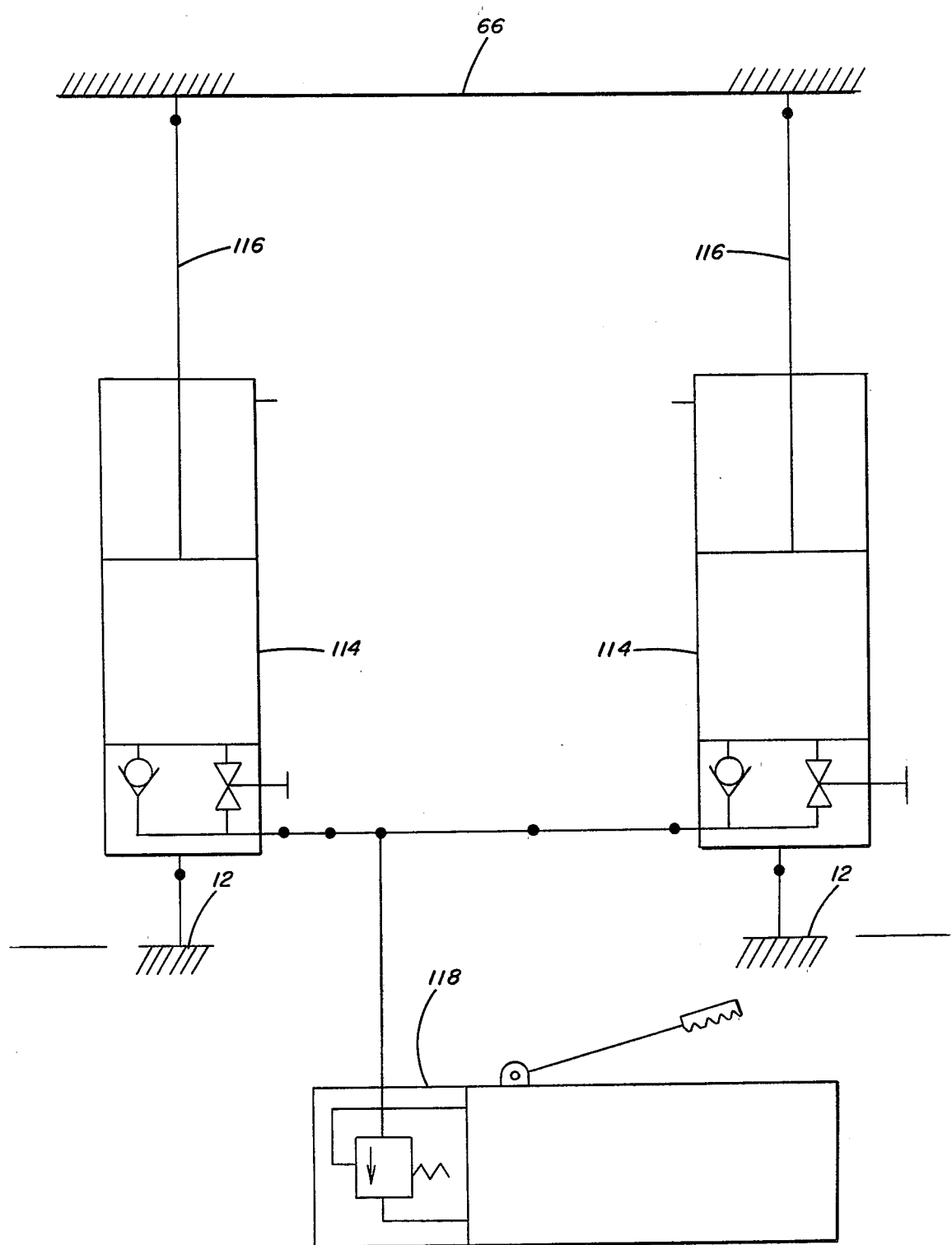
FIG. 9 is a schematic view of a mechanical system for tilting the sleeper unit with respect to the vehicle frame including hydraulic pump, lines and cylinders.

Many types of known mechanical systems may be used to tilt the sleeper unit. In FIG. 9, one such system incorporating the elements of the present invention is shown in schematic. The two cylinders 114 are mounted on the cab frame 12. The pistons 116 of the cylinders are connected to the support members 66 of the sleeper unit. When pump 118 is actuated, hydraulic fluid under pressure, for example, causes extension of the pistons 116 with respect to the cylinders 114 lifting the forward end of the sleeper unit, thus tilting the unit to allow tilting of the tractor cab for access to the vehicle engine for maintenance and/or repair.

Equivalent pneumatic or other fluid operated systems may also be used. The compartment may also be tilted manually, if necessary.

The present invention provides a compact, versatile, economical sleeper unit for a motor vehicle, and more particularly for an over-the-road type tractor having a cab-over-engine design. It is apparent that neither the invention nor its application is limited to such a vehicle. For example, the sleeper unit could be used with a standard non-tilt cab tractor and access to the unit could be obtained by one or more outside doors to the unit instead of or in addition to the interior access means herein disclosed.

Having described presently preferred embodiments of the invention, it is to be understood that it may be otherwise embodied within the scope of the appended claims.

I claim:

1. A sleeper unit for a motor vehicle including a frame with a forwardly tiltable cab mounted thereon, said sleeper unit comprising a closed compartment having at least four upstanding walls supporting a top wall, and means for mounting said compartment on said vehicle frame; said compartment mounting means comprising support means provided on the vehicle frame for supporting the compartment and fastening means connecting said support means with said compartment at the rear of said compartment whereby said compartment can be tilted with respect to said frame by raising the front of said compartment; and a part of said compartment extending forwardly of the frame over the cab.

2. A sleeper unit as set forth in claim 1 wherein said compartment includes a floor.

3. A sleeper unit as set forth in claim 1 wherein one of said upstanding walls is a front wall and said front wall includes an access opening which is adapted to lie adjacent the cab of the vehicle.

4. A sleeper unit as set forth in claim 1 wherein said compartment can be tilted by means of pneumatic cylinders.

5. A sleeper unit as set forth in claim 1 wherein said compartment can be tilted by means of hydraulic cylinders.

6. A sleeper unit as set forth in claim 1 and including means between said forwardly extending compartment portion and said cab for absorbing shock therebetween.

7. In combination with a motor vehicle having a frame with a forwardly tiltable cab mounted thereon, a sleeper unit comprising a closed compartment having at least four upstanding walls supporting a top wall, and means for mounting said compartment on said vehicle frame, said compartment mounting means comprising support means provided on the vehicle frame for supporting the compartment and fastening means connecting said support means with said compartment at the rear of said compartment whereby said compartment can be tilted with respect to said frame by raising the front of said compartment and a part of said compartment extending forwardly of the frame over the cab.

8. The combination as set forth in claim 7 wherein said compartment includes a floor.

9. The combination as set forth in claim 7 wherein one of said upstanding walls is a front wall and said front wall includes an access opening which is adapted to lie adjacent the cab of the vehicle.

10. The combination as set forth in claim 9 wherein the cab includes an access opening in a rear wall thereof and opposite the access opening in said compartment to provide interior access between the cab and the compartment.

11. The combination as set forth in claim 10 and including means for sealing the peripheries of said access openings to one another.

12. The combination as set forth in claim 11 wherein said sealing means comprises sealing elements extending in abutment around the peripheries of each of said openings.

13. The combination as set forth in claim 7 and including means for tilting at the front of said compartment for tilting said compartment with respect to said frame.

14. The combination as set forth in claim 13 wherein said tilting means comprises pneumatic cylinders.

15. The combination as set forth in claim 13 wherein said tilting means comprises hydraulic cylinders.

16. The combination as set forth in claim 7 and including means between said forwardly extending compartment portion and said cab for absorbing shock therebetween.

17. The combination as set forth in claim 7 wherein said cab is tiltable with respect to said frame.

18. The combination as set forth in claim 17 wherein said cab is tiltable in a direction away from the compartment.

19. The combination as set forth in claim 7 wherein the vehicle muffler is secured to an upstanding wall of said compartment and connected to the vehicle engine manifold through flexible conduit extending adjacent the compartment.

20. The combination as set forth in claim 19 wherein the flexible conduit extends beneath the compartment and within the vehicle frame.

21. In combination with a motor vehicle having an engine manifold and having a frame with a cab mounted thereon, a sleeper unit comprising a closed compartment having at least four upstanding walls supporting a top wall, a part of said compartment extending forwardly of the frame over the cab, means for mounting said compartment on said vehicle frame such that said compartment is tiltable with respect to said frame, and a vehicle muffler secured to an upstanding wall of said compartment and connected to the vehicle engine manifold through flexible conduit extending adjacent the compartment.

* * * * *